(12) United States Patent
Martin

(10) Patent No.: US 6,272,228 B1
(45) Date of Patent: Aug. 7, 2001

(54) METHOD FOR MAKING A SOUND TRANSDUCER INTEGRATED INTO AN ACOUSTIC SIGNAL GENERATING CARD

(75) Inventor: Philippe Martin, Beaune (FR)

(73) Assignee: GemPlus, Gemenos (FR)

( * ) Notice: Subject to any disclaimer, the term of this patent is extended or adjusted under 35 U.S.C. 154(b) by 0 days.

(21) Appl. No.: 09/065,087

(22) PCT Filed: Oct. 25, 1996

(86) PCT No.: PCT/FR96/01667

§ 371 Date: Sep. 1, 1998

§ 102(e) Date: Sep. 1, 1998

(87) PCT Pub. No.: WO97/16049

PCT Pub. Date: May 1, 1997

(30) Foreign Application Priority Data

Oct. 26, 1995 (FR) .................................................. 95/12660

(51) Int. Cl.⁷ .................................................. H04R 25/00
(52) U.S. Cl. .......................... 381/191; 310/8.3; 381/190; 381/173; 73/774; 379/444
(58) Field of Search ................. 310/8.3; 73/774; 381/191, 190, 398, 392, 173, 113, 114; 379/444

(56) References Cited

U.S. PATENT DOCUMENTS 4,752,678 * 6/1988 Rikuna .
4,889,980 * 12/1989 Hara .
5,293,035   3/1994 Lyons .

FOREIGN PATENT DOCUMENTS

| 0209791 | 7/1986 | (EP) . |
| 0664633 | 11/1995 | (EP) . |
| 2263999 | 8/1993 | (GB) . |
| WO 94/17562 | 8/1994 | (WO) . |

\* cited by examiner

Primary Examiner—Curtis Kuntz
Assistant Examiner—Dionne Harvey
(74) Attorney, Agent, or Firm—Roland Plottel

(57) ABSTRACT

The invention relates to a sound transducer in fluoride polyvinylidene (FPVD), its process of manufacture and integration into a card producing acoustic signals transmittable by telephone route. The process is chiefly characterized in that it consists of making (10) dual surface metallization strips distributed over the entire width of a ribbon in FPVD of great length and of very narrow thickness, cutting (11) each metallization strip into a unit film, fixing (12) a portion of film onto a pre-determined site of an interconnection array made on the rear surface of the card, cutting away excess film, then placing the film portion under stress (13), in such manner that it may emit acoustic signals when voltage is applied to it.

Figure 1:
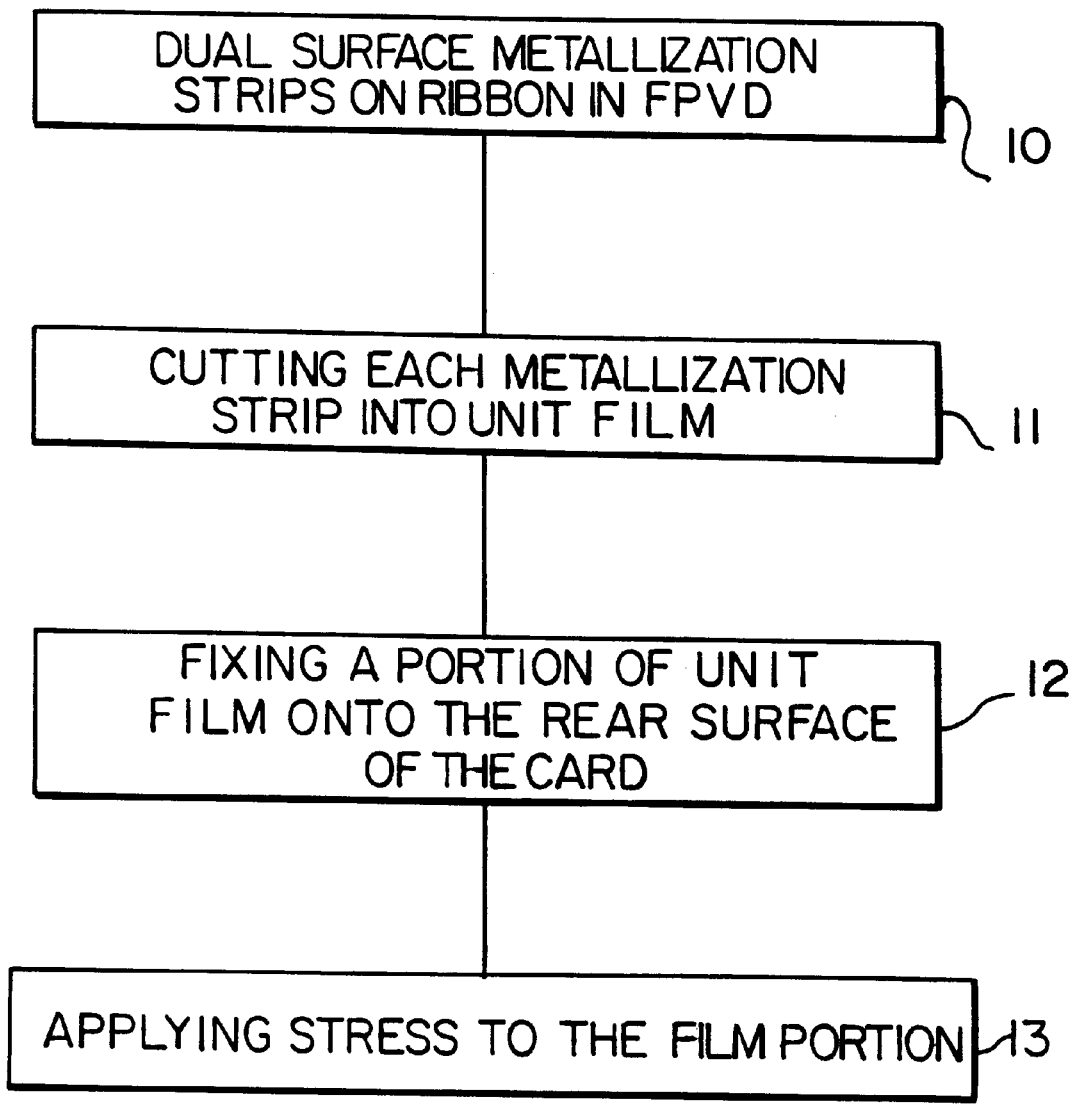

This process is highly useful for the manufacture of acoustic signal producing cards of very narrow thickness and low cost price.

7 Claims, 4 Drawing Sheets

METHOD FOR MAKING A SOUND TRANSDUCER INTEGRATED INTO AN ACOUSTIC SIGNAL GENERATING CARD

This invention relates to a sound transducer and more particularly to its process of manufacture and its integration into a card of narrow thickness able to produce acoustic signals.

Said card can be used to transfer confidential information in secure manner, towards a server for example, via a telephone line.

Acoustic signals are produced following the principle of data coding by a pair of frequencies of 697 to 1633 Hz and are better known by their English term Dual Tone Modulation Frequency (DTMF). In telephony these DTMF signals are used for numbering, code transmission etc.

Today it is known how to fabricate sound transducers in ceramic having a thickness of approximately 0.3 mm, for their insertion into cards of narrow thickness, that is to say approximately 0.8 mm thick. However, such transducers in ceramic are very expensive and considerably increase card cost price.

Other materials are therefore being researched with a view to producing low cost sound transducers. In particular, the use of a material in fluoride polyvinylidene (FPVD) has already been considered. FPVD is an advantageous material since it is cheap and also allows maintained amplitude differences existing between the two frequencies which determine DTMF signals.

However, up until now, it has proved impossible to produce a very thin FPVD transducer for its insertion into a card of conventional format, having a thickness of approximately 0.8 mm. The FPVD sound transducers currently produced all comprise two FPVD films that are electrically connected and placed under stress. These films are housed in a frame whose thickness lies between 0.8 and 1 mm. Each transducer thus formed forms a unit part which must then be fixed in a card, with contacts re-connected by means of conductor wires.

The assembly of such transducer in a card therefore requires meticulous care and is fastidious and time consuming. Also, the card is too thick, more than the normalized thickness for electronic cards since it is between 1.5 and 2 mm. Finally, the sound transducer is fragile since it cannot resist against stresses due to bending of the card in which it is inserted.

The present invention remedies all these drawbacks since it describes a process for manufacturing a sound transducer in FPVD and integrating the latter into a card of conventional format for electronic cards in accordance with standard ISO 78.16-12 and whose thickness is reduced to approximately 0.8 mm. This card can be used to produce acoustic signals transmittal by telephone route. On its rear surface it carries an interconnection array. The process of the invention is particularly characterized in that it consists of:
  making dual surface metallization strips, forming electrodes, distributed over the entire width of a ribbon in FPVD of great length and of very narrow thickness,
  cutting off each metallization strip to form unit films of great length,
  fixing a portion of the film onto a predetermined site of the interconnection array on the rear surface of the card and cutting off excess film, and
  placing the film portion under stress in such manner that it can emit acoustic signals when voltage is applied to it.

A further object of the invention concerns a sound transducer in FPVD integrated into a card producing acoustic signals transmittable by telephone route, whose rear surface carries an interconnection array, characterized in that it comprises:
  grooves parallel to one another made on the rear surface of the card,
  a portion of film in FPVD, of very narrow thickness, carrying two electrodes, one lower and one upper, connected to the interconnection array of the card, and
  a stress part whose lower side comprises notches parallel to one another able to position themselves opposite the grooves and to press upon the portion of film so as to impart indentations upon it.

The sound transducer of the present invention is made within the card producing DTMF signals. Consequently, the transducer no longer has the appearance of a unit part inserted into the card but forms an integral part of the card. On this account, its mechanical resistance to stresses due to bending of the card for example is largely improved. Also, the integration of the transducer into the card is simple to perform by gluing.

Other particularities and advantages of the invention will be apparent on reading the description given by way of illustration which is non-restrictive and refers to the appended figures which represent:
  FIG. 1, an organization diagram illustrating the stages of the process of the invention,
  FIG. 2, metallization strips on a ribbon of great length;
  FIGS. 3A to 3E, diagrams of a card of narrow thickness during the integration of a sound transducer of the invention,
  FIG. 4, a cross section view A—A of the sound transducer of FIG. 3D.

One embodiment of a process in accordance with the invention is summarized in the organization diagram of FIG. 1. Such process consists, in an initial stage 10, of making dual surface metallization strips on a ribbon in FPVD of great length and of very narrow thickness. These metallization strips are distributed over the entire width of the ribbon and their width corresponds to that of the transducer to be produced. The manner in which these metallizations are made is explained below. During the next stage 11, each metallization strip is cut off to form a unit film of great length that is entirely metallized on its two surfaces, lower and upper. The metallizations therefore form two electrodes, one lower, one upper, on the unit film. In parallel to stages 10 and 11, passive and active electronic components are fixed and wired onto the rear surface of a card. Subsequently, during stage 12, one portion of the unit film is fixed to the rear surface of the card and more precisely its two electrodes are connected to an interconnection array made on this rear surface. The fixing of the film portion is described below. Finally, stage 13 consists of placing the portion of film under stress so that it may emit acoustic signals when voltage is applied to it.

Figure 2:
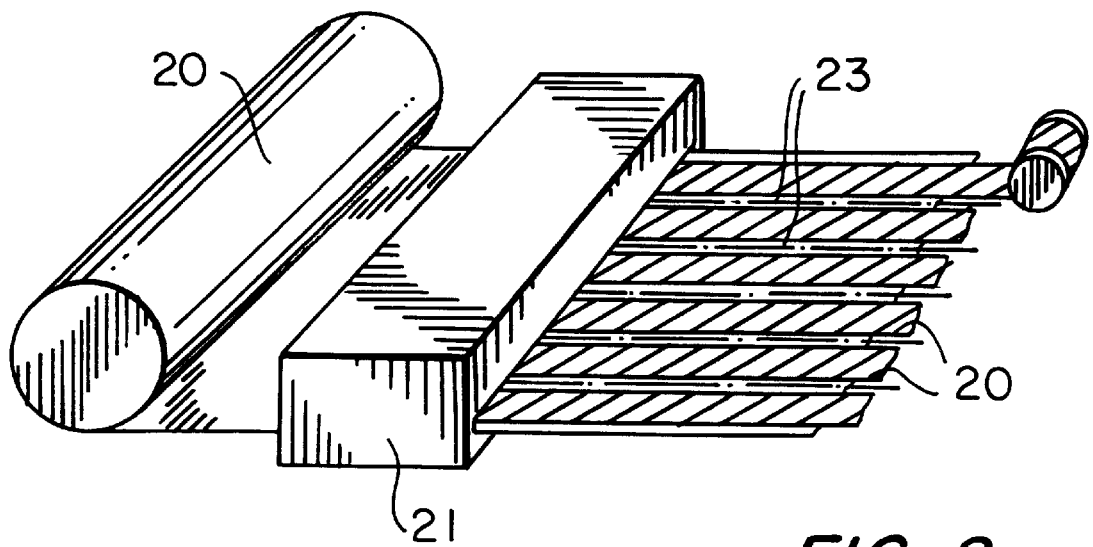
Figure 3A:
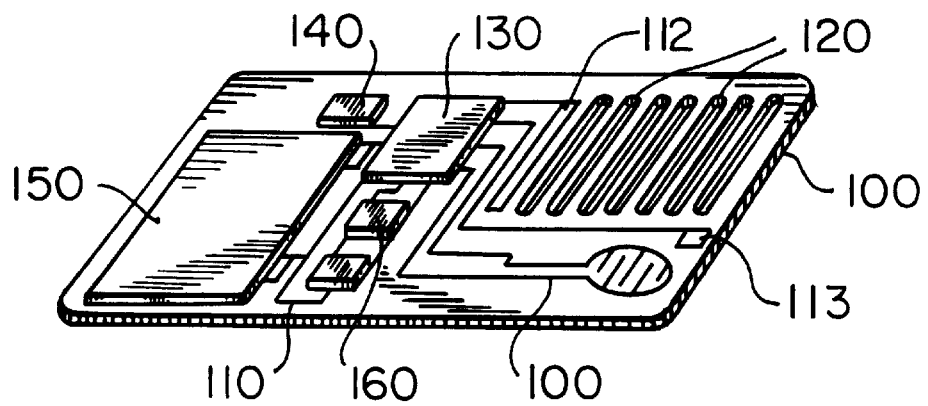
Figure 3B:
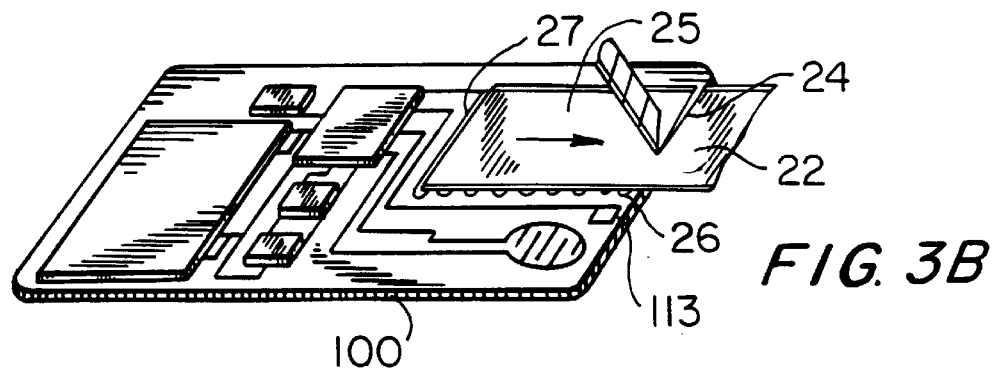
Figure 3C:
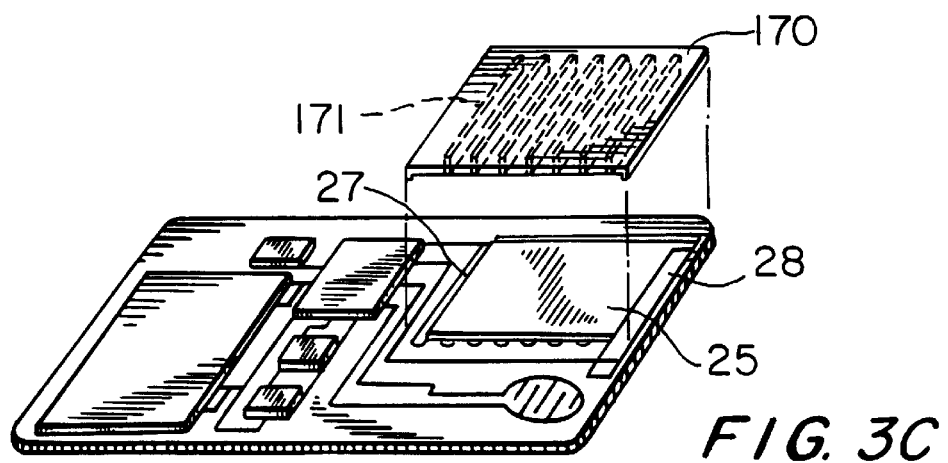
Figure 3D:
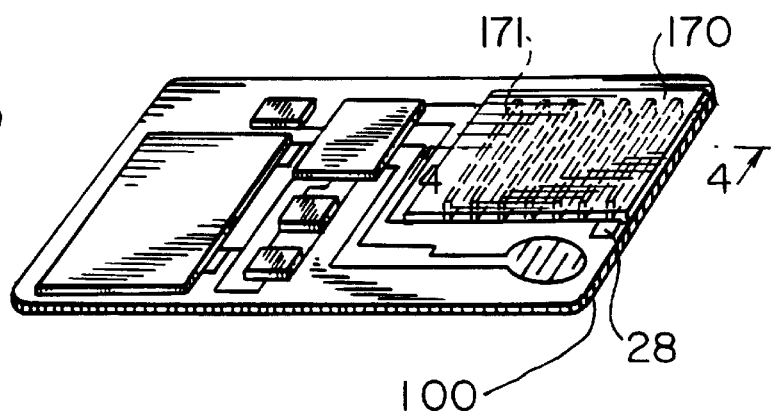
Figure 3E:
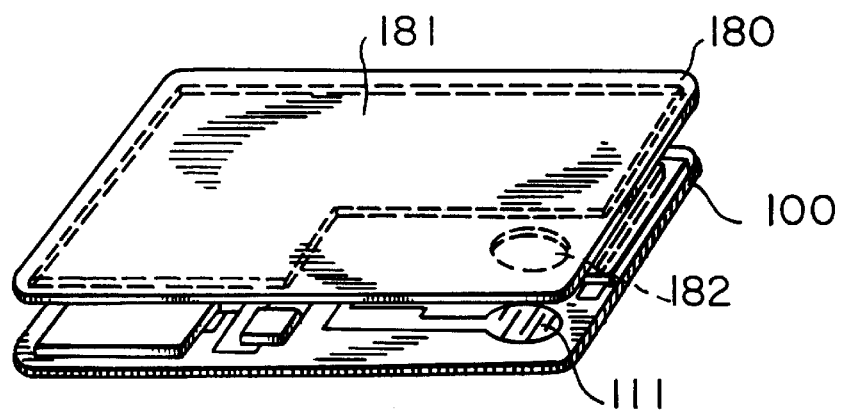
Figure 4:
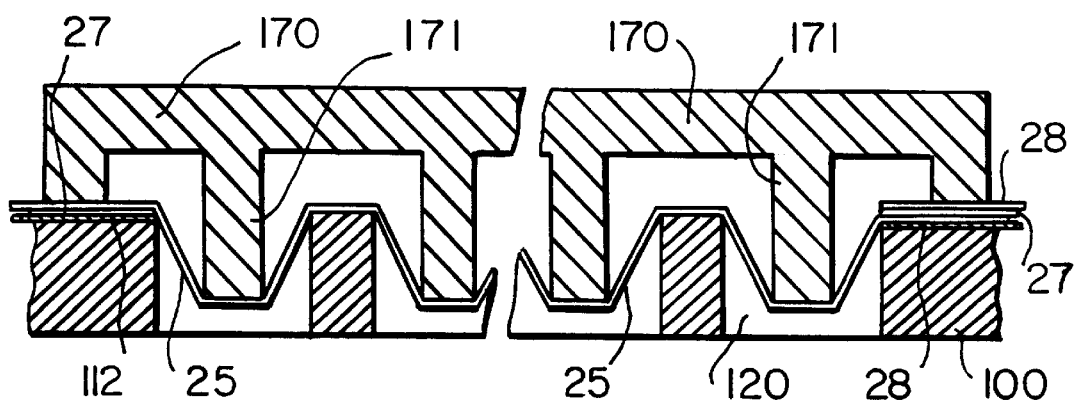

All these stages of the process will be better understood with reference to FIGS. 2 to 4.

FIG. 2 illustrates one embodiment of producing metallization strips 22 on ribbon 20 of great length and of very narrow thickness. Ribbon 20 is in fluoride polyvinylidine (FPVD) and is in the form of a roll. Advantageously, the molecular dipoles of the FPVD are previously oriented, in permanent manner, using a method well known to those skilled in the art. The roll is gradually unrolled and carried, at constant speed, into a depositing chamber 21.

Metallization strips 22 are then made on the lower and upper surfaces of this ribbon, using an evaporation process for example, in chamber 21.

In order to achieve uniform strips of constant width, masks, not shown in FIG. 2, are placed in evaporation chamber 21. The small, remaining non-metallized strips, of identical width to that of the masks placed in the evaporation chamber, that is to say having a width of approximately 10 mm, advantageously form cutting axes 23. These cutting axes 23 are used to cut each metallization strip 22 into a unit film of great length and very narrow thickness, of between 9 and 12 µm.

Also, cutting axes 23, non-metallized, are sufficiently wide to avoid any formation of a side short-circuit between the two metallized surfaces of a strip during cutting.

FIGS. 3A to 3E illustrate the finishing stages of a transducer made in accordance with the process of FIG. 1 and, more particularly, the illustrate the manner in which such transducer is integrated into a card of narrow thickness. Therefore, FIG. 3A shows the rear surface 100 of a card producing acoustic signals. The upper part of this rear surface 100 carries an interconnection array 110 on which are fixed the required electric components for the card to operate, namely: a micromodule 140, a circuit 130 producing acoustic signals, a resonator 160, a battery 150 and other passive components. These electronic components are fixed by gluing, for example, using an anisotropic conductor adhesive.

Also, grooves 120 are made on rear surface 100 at the site of the sound transducer. These grooves are oriented parallel to one another widthwise in relation to the card, for example, and are made between two contact points 112, 113 of interconnection array 110. These two contact points 112, 113 are provided for connection of the upper and lower electrodes of a portion of unit film such as described above. The width of each groove is preferably between 2 mm and 3 mm for a transducer whose length lies between 27 and 35 mm. Also, the depth of each groove is in the region of 0.19 mm for a rear surface with a thickness of approximately 0.2 mm. According to one variant of embodiment, the grooves may also be directed lengthwise over the card parallel to each other. In this case, the fabrication of the integrated transducer of the invention is identical, a rotation of 90° C. simply exists in relation to the description already given. Rear surface 100 is preferably made in a material having good mechanical rigidity such as epoxy glass for example.

Unit film 22 in FPVD, metallized on its two surfaces, is subsequently placed in position, in such manner as to cover grooves 120 as shown in FIG. 3B. For this purpose, the unit film is previously made taut and then glued, first to one end position, onto a first contact point 112 on interconnection array 110. Gluing is made using an anisotropic conductor adhesive 27 in order to connect the lower electrode of film 22 electrically to contact point 112. The film is also glued on rear surface 100 of the card, to a second end position using ordinary glue 26 of conventional type. Film 22 is then cut along cutting axis 24 in such manner as to cut away excess film and maintain solely a portion of film 25 fixed, at both its ends, onto rear surface 100 of the card.

Caution must however be taken when cutting the film to avoid any side short-circuits likely to form between the lower and upper electrodes of film portion 25. Such precaution consists in particular of using very slow cutting procedure without pressing upon film portion 25.

Preferably, film portion 25, metallized either side, is fixed to rear surface 100 in such manner that the molecular dipoles are oriented parallel to the longitudinal side of rear surface 100 of the card.

Also, the thickness of this film portion 25 is very narrow since it advantageously lies between 9 and 12 µm.

In a following stage, illustrated in FIG. 3C, a second electric connection is made between unit film portion 25 and interconnection array 110. The upper electrode of film portion 25 is connected to the second contact point 113 of interconnection array 110, located near the second end position of the film portion. For this purpose a metal wafer 28 is fixed on the upper electrode of film portion 25 and on second contact point 113 using an anisotropic conductor adhesive.

Film portion 25 having been fixed onto the rear surface of the card, it must subsequently be placed under stress so that it may emit sound signals when voltage is applied to it. A stress part 170 of rectangular shape able to cover the entire surface of film portion 25 is then made.

Advantageously, notches 171 are made on the lower side of stress part 170. These notches 171 are parallel to one another and oriented widthwise in relation to part 170. Therefore when stress part 170 is positioned, notches 171 come to place themselves opposite grooves 120 of rear surface 100 and exert pressure on film portion 25 so as to impart indentations upon it.

Since the molecular dipoles of the FPVD are oriented, the response of film portion 25 becomes anisotropic when the latter is placed under stress. For this purpose, it is important to fix film portion 25 in such manner that its molecular dipoles are perpendicular to grooves 120. It is when stress is applied in a manner that is perpendicular to the orientation of the molecular dipoles of the FPVD that the sound transducer made in accordance with the present invention best operates. This is why, since grooves 120 are made widthwise in relation to the card, film portion 25 is fixed so that its molecular dipoles are oriented parallel to the longitudinal side of the card. In the variant described above, when the grooves are made lengthwise in relation to the card, film portion 25 and stress part 170 need only be rotated through 90°.

Preferably the transducer thus produced and shown in its entirety in FIG. 3D, is of rectangular shape, with a width of between 25 and 30 mm and a length of between 27 and 35 mm.

Also, when the transducer is placed in operation, another problem was raised since, according to the theoretical teaching of the prior art, a voltage of roughly one hundred volts would need to be applied to the terminals of the transducer of the invention, in order to obtain response similar to that of a conventional ceramic transducer, to whose terminals a voltage of three to six volts is applied. Yet, surprisingly, it was ascertained that a voltage of twelve volts applied to the terminals of the transducer produced in accordance with the present invention allows correct response to the obtained.

Rear surface 100 of the card is subsequently covered by a front surface 180 as illustrated in FIG. 3E, in whose lower side is made a large cavity 181 able to support the electronic components fixed on the rear surface. Also a pad, not shown in FIG. 3E, placed in cavity 182 of front surface 180, is used to actuate a system triggering circuit 130 which produces acoustic signals. With this pad it is possible to by pass contact points 111 in interdigital lines, belonging to interconnection array 110, in such manner as to establish contact able to trigger circuit 130.

According to one variant it is possible to make the stress part directly on the lower side of front surface 180. In this way it forms an integral part of the front surface of the card. Also this further reduces the thickness of the card.

FIG. 4 shows a section diagram A—A of the sound transducer of FIG. 3D. Rear surface 100 is shaded. The depth of grooves 120 is approximately 0.19 mm and their width is between 2 and 3 mm. At one first end, on the left in FIG. 4, the lower electrode of film portion 25 in FPVD is electrically connected to the first contact point 112 of the interconnection array, by means of an anisotropic conductor adhesive 27. At a second end, on the right in FIG. 4, the lower electrode of film portion 25 is fixed to rear surface 100 by gluing, using ordinary glue 26, and the upper electrode is electrically connected to second contact point 113 of the interconnection array, not shown in FIG. 4, via a metal wafer 28 fixed by gluing using an anisotropic conductor adhesive 27.

Stress part 170 with its notches 171 has a thickness which preferably lies between 0.3 and 0.4 mm. Notches 171 are positioned opposite grooves 120 made on rear surface 100 and press upon film portion 25 so as to impart indentations upon it. Also grooves 120, advantageously, form types of small cavities in which the film portion in FPVD, placed under stress, can vibrate when voltage is applied to it.

According a variant of embodiment, it is also possible to make outlet holes, not shown in FIG. 4, distributed in regular fashion along grooves 120 of rear surface 100 in such manner that they facilitate emission of acoustic signals.

What is claimed is:

1. Sound transducer in fluoride polyvinylidine (FPVD) integrated in a card producing acoustic signals transmittable by telephone route, whose rear surface (100) carries an interconnection array (110), characterized in that it comprises:

grooves (120) parallel to one another, carried by rear surface (100) of the card, a film portion (25) in FPVD, of very narrow thickness, supporting two electrodes, one lower, one upper, which are connected to interconnection array (110) of the card, and a stress part (170) whose lower side comprises notches (171) parallel to one another, able to position themselves opposite grooves (120) and to press upon film portion (25) to impart indentations upon it, and the thickness of stress part (170) fitted with notches (171) being between 0.3 and 0.4 mm.

2. Transducer in accordance with claim 1, characterized in that the thickness of film portion (25) lies between 9 and 12 $\mu$m.

3. Transducer in accordance with claims 1, to 2, characterized in that it is of rectangular shape, having a width of between 25 and 30 mm and a length of between 27 and 35 mm.

4. Sound transducer in fluoride polyvinylidine (FPVD) integrated in a card producing acoustic signals transmittable by telephone route, whose rear surface (100) carries an interconnection array (110), characterized in that it comprises:

grooves (120) parallel to one another, carried by rear surface (100) of the card, a film portion (25) in FPVD, of very narrow thickness, supporting two electrodes, one lower, one upper, which are connected to interconnection array (110) of the card, and a stress part (170) whose lower side comprises notches (171) parallel to one another, able to position themselves opposite grooves (120) and to press upon film portion (25) to impart indentations upon it, and stress part (170) forms an integral part of front surface (180) of the card.

5. Transducer in accordance with claim 4, characterized in that the thickness of stress part (170) fitted with notches (171) is between 0.3 and 0.4 mm.

6. Transducer in accordance with any of claims 1, or 2, or 5, or 4, characterized in that grooves (120) have a depth of approximately 0.19 mm.

7. Transducer in accordance with any of claims 5 or 4 characterized in that the thickness of film portion (25) lies between 9 and 12 $\mu$m.

* * * * *